2,856,342
ANTI-CORROSION ANODE

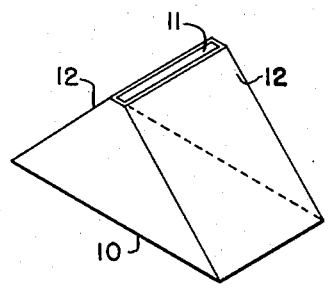
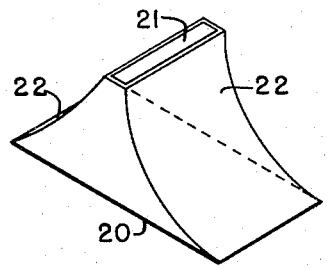
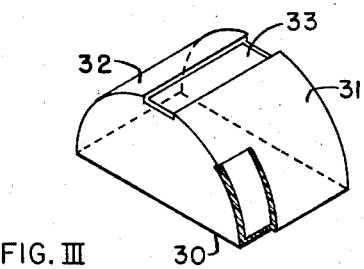
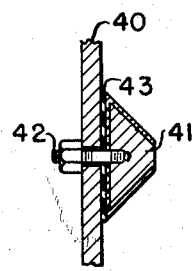
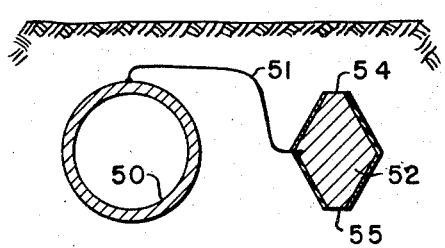
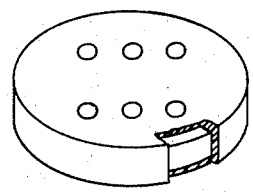
INVENTORS:
Hendrik Willem van der Hoeven
Marinus Oudeman
BY: *William H. Myers*
THEIR AGENT United States Patent Office 2,856,342
Patented Oct. 14, 1958

Hendrik Willem van der Hoeven and Marinus Oudeman, Amsterdam, Netherlands, assignors to Shell Development Company, New York, N. Y., a corporation of Delaware Application November 8, 1954, Serial No. 467,564

Claims priority, application Netherlands December 21, 1953

4 Claims. (Cl. 204—197)

This invention relates to an improved construction for consumable metal anodes used in the galvanic protection of corrodible metal structures as well as to an improved method of galvanic protection.

In the galvanic protection of metallic structures immersed in or in contact with aqueous solutions of electrolytes, consumable electrodes of a metal anodic to the metal of the structure are buried in the earth or immersed in the water adjacent to the structure and are connected to the structure by electrical conductors. The resulting flow of current maintains the structure cathodic with respect to the soil or water and greatly retards corrosion.

Anodes commonly employed for such purposes have consisted of blocks of strongly basic metals such as zinc or magnesium, or alloys of these metals. These usually have had a plain surface which is intended to be consumed at a reasonably even rate. Under some circumstances, it has been found desirable to have a high initial rate so as to polarize the surface of the metal to be protected, after which a lower current may be desirable so as to avoid undue consumption of the anode and other undesirable side effects might be depressed.

However, particularly when the surface to be protected is painted or otherwise covered with a protective coating, this latter sequence of anodic protection is not to be considered. In this case, especially with respect to painted ferruginous surfaces and the like, the change in the potential difference between the surface and the electrolyte solution, such as ground water or sea water, may cause blisters to form in the paint coating which then peels off, leaving an exposed portion of the ferruginous surface. This phenomenon is most in evidence in the neighborhood of the anodes where the current density is greatest.

Although corrosion is prevented by the presence of the anode at the place where the paint has disappeared, the preventive effect as regards the growth of organisims is greatly reduced.

Often it is also the case that the current generated with cathode protection is much stronger than is necessary for the required effect. Particularly in the beginning, when the coat of paint is still relatively undamaged, the current may be too strong. This not only results in the additional damage already referred to but also causes an ineffective consumption of the anode metal.

It is an object of the present invention to improve the process of cathodic protection. It is a further object of this invention to provide an improved anode for use in cathodic protection. It is an additional object of the invention to provide an improved combination of a ferruginous structure to be protected and an improved anode. Other objects will become apparent during the following discussion. These objects will be more readily understood and others will become apparent from the description of the invention, which will be made with reference to the accompanying drawing, wherein:

Figures I to III and VI represent embodiments of anodes to be employed in the practice of the invention; Figure IV represents the assembly of a ship's skin protected by one of the subject anodes; and Figure V represents a pipe so protected.

Now, in accordance with the present invention, it has been found that an improved shape of the anode for use in cathodic protection comprises one in which the surface area of the anode exposed to an electrolyte solution, e. g., sea water or wet soil, increases during the period when the anodes are in use. More particularly, in accordance with this invention, an improved process of cathodic protection has been devised wherein an anode of a metal higher in the electromotive series than the metal being protected and in electrical contact therewith gradually increases in surface area exposed to an electrolyte solution while the anode is being consumed. In a preferred embodiment of the invention, the face of the anode most directly in electrical contact with the metal being protected is insulated from said metal (except at the point of electrical contact; or metallic fastening means) and is insulated from the aqueous salt medium as well.

As stated herein before, the invention applies especially to painted surfaces, but is likewise applicable to ferruginous or other corrodible surfaces whether or not they bear a protective surface coating.

The three most common types of metallic surfaces protected by cathodic means comprise ship hulls, storage tanks and buried pipes. Each of these types of metallic structures continuously or periodically comes in contact with solutions of electrolytes such as sea water or brackish ground water. These solutions cause serious corrosive damage unless the system of cathodic protection is employed or unless the surface is fully protected by other means.

A practical method of increasing the surface of the anode is that in which the anode surface is only in partial contact with the electrolyte solution and the rest is covered with a protective layer which does not conduct electricity. The anode is of such a form that in the direction in which the consumption thereof progresses, the surface of the cross-section thereof taken at right angles to this direction, increases. Anodes are preferably employed in which the surface in contact with the corrosive electrolyte solutions may become at least five times and more preferably up to about 10 times (or more) as large during their use as in their original condition.

The protecting non-conducting layer for said anodes may be for example, paint, lacquer, varnish, bitumen, rubber or other macromolecular coatings including resins. The consumable anode may be made of such metals as magnesium, aluminum, or zinc, with magnesium being the preferred metal.

A suitable shape of anode is of a multisided shape which is bounded by two trapezia as well as by four rectangles. A shape of this kind is shown in Figure I. The anode is placed with the largest parallel rectangular interface 10 against the surface to be protected. Connection of the anode and the surface to be protected may be effected by means of bolts. The smallest parallel rectangular interface 11 is in contact with the liquid, and the remaining interfaces 12 are covered with a protecting layer not conducting the electricity. It is advisable to provide a layer, which is also non-conducting, and consists of a thin rubber (or other insulator) layer between the interface 10 and the surface to be protected.

The direction in which the anode metal is consumed is perpendicular to the rectangular face 11 in contact with the liquid. The surface of the cross-section of the said multisided anode perpendicular to the latter direction and thus parallel to the rectangular parallel interfaces gradually increases from the smallest 11 to the largest 10 rectangular parallel interface. As consumption progresses the anode thus presents a constantly increasing surface to the corrosive liquid.

Other shapes of anodes may be employed with a corresponding effect, provided these shapes are such that the surface in contact with the corrosive liquid increases during the time the anodes are in use. Also suitable is an anode in a frustoconical form, the base being placed against the surface to be protected and the top face in contact with the liquid.

The interfaces of the anodes also may be curved. Thus, in the multi-sided anode described, the two rectangular faces covered with a protecting layer may be substituted by curving faces, preferably hollow ones.

Figure IV shows a typical combination of the hull of a ship 40 and an anode of the character described for Figure I, 41 which is electrically connected to the hull 40 by means of nut and bolt 42. A rubber gasket 43 is preferably inserted between the anode 41 and the ship's hull 40.

Figure V shows a similar combination of a pipeline electrically connected through copper wire 51 with the magnesium anode 52, the magnesium anode being coated with a resinous lacquer except at faces 54 and 55. It will be seen that in the latter instance a multiple opportunity has been created for increasing the surface area of the magnesium anode during its consumption.

A further type of surface suitable for being increased during consumption of the metal composing the anode is illustrated in Figure II. The broad base 20 is bolted to the surface to be protected such as the ship's side. The exposed face 21 gradually increases in area as the anode is consumed, the curved faces 22 being coated with a protective lacquer.

A still further shape suitable for use in the present invention comprises that typified by Figure III. An anode of this character is a half-round, the face 30 being conductively connected to a surface being protected such as an oil storage tank. The curving surface of the anode is coated with a protective lacquer over the areas 31 and 32, while the remainder of the surface 33, is exposed to the action of the electrolyte solution.

Figure VI is a still further type of suitable anode shape, wherein a metallic disc covered with an insulating coating is perforated by a number of holes through the coating and into the disc or through the disc.

*Example*

A steel skin of a ship (A) was provided with anodes of a shape indicated in Figure II. The anodes consisted of magnesium with 6% aluminum and 3% zinc. The measurements are given in cm. The number of anodes was 1 per 2 square metres of the ship's skin to be protected.

For purposes of comparison another ship's skin (B) was provided with anodes of the same magnesium alloy in a half-round rod, 5 cm. in radius and 5 cm. in length, also 1 per 2 square metres.

The ships' skins were covered with a usual system of an asphaltic base paint. The curved faces 22 of the anodes, shown in Figure II, were covered with an ethoxyline resin (Epikote 1001, made by N. V. de Bataafsche Petroleum Maatschappij and being a glycidyl polyether of 2,2 - bis(4 - hydroxyphenyl)propane) paint base, while the anode used with ship B was not coated.

For two months both ships' skins were exposed to the effect of the brackish water of the Ij, a bay at Amsterdam. Under such conditions, ship A showed effective protection against corrosion and practically no damage to the coat of paint, even in the vicinity of the anodes. Ship B showed over the whole surface to a considerable degree the phenomenon of the formation of blisters under the paint; in the case of ship B, the coat of paint was damaged in the vicinity of the anodes even after a few days.

The following amperages were measured (in ma.):

| Period, after— | Ship A | Ship B |
| --- | --- | --- |
| 1 day | 3 | 5 |
| 5 days | 8 | 17 |
| 10 days | 10 | 27 |
| 15 days | 12 | 34 |
| 20 days | 10 | 40 |
| 25 days | 11 | 44 |
| 30 days | 11 | 51 |
| 35 days | 13 | 58 |
| 40 days | 10 | 60 |
| 45 days | 14 | 62 |
| 50 days | 13 | 63 |

We claim as our invention:

1. A consumable metal anode for the protection of a metal surface corrodible by an electrolyte in contact therewith, said metal anode being anodic with respect to the metal surface to be protected, characterized in that the anode is of a multisided shape bounded by a smaller and a larger parallelogram parallel to each other and connected by four surfaces, the four surfaces and the larger parallelogram being electrically insulated from external contact and the smaller parallelogram being electrically exposed.

2. The combination comprising a ferruginous structure and, electrically connected with said structure, a consumable metal anode according to claim 1.

3. The combination comprising a ferruginous ship hull and, electrically connected with said hull, a consumable metal anode according to claim 1.

4. A consumable metal anode for the protection of a metal surface corrodible by an electrolyte in contact therewith, said metal anode being anodic with respect to the metal surface to be protected, characterized in that the anode is of a semi-cylindrical shape, a substantial portion of the curving face, the two flat faces and the flat back of said anode being electrically insulated from outside contact, and the remaining portion of said curving face being electrically exposed.

References Cited in the file of this patent

UNITED STATES PATENTS

| 1,269,926 | Gesell | June 18, 1918 |

FOREIGN PATENTS

| 451,088 | Great Britain | July 29, 1936 |
| 479,612 | Italy | Apr. 7, 1953 |